United States Patent Office 3,025,928
Patented Mar. 20, 1962

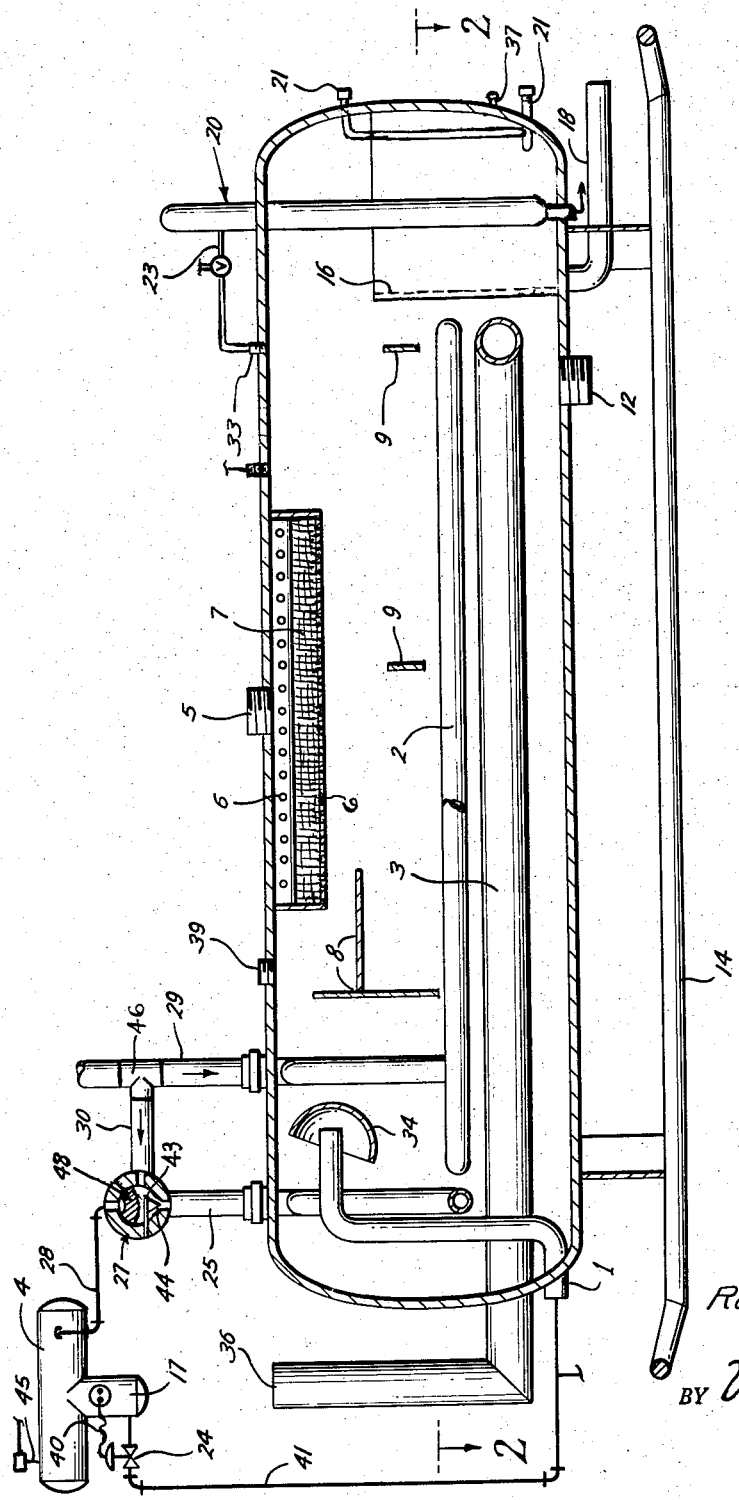

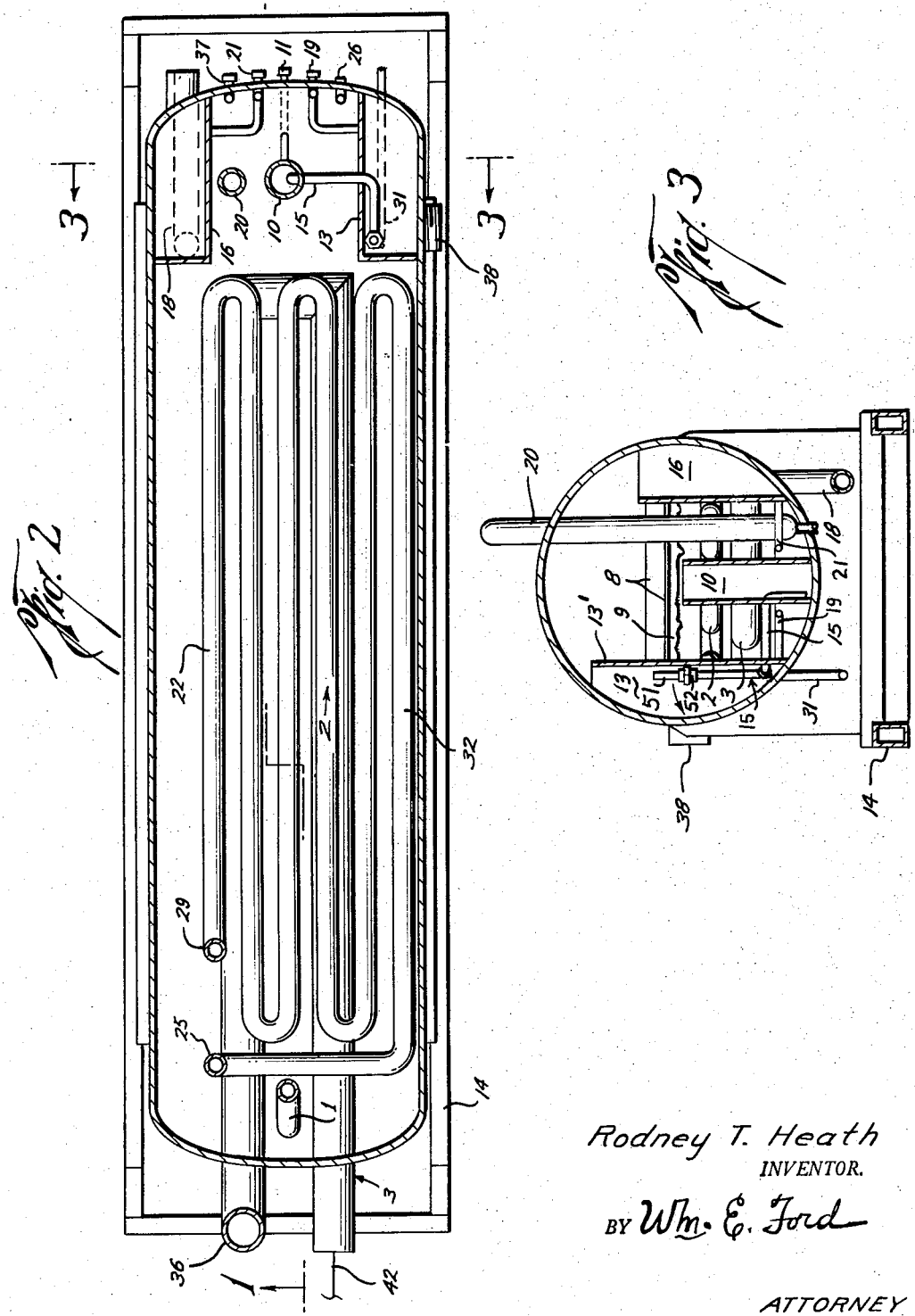

3,025,928
OIL AND GAS SEPARATOR
Rodney T. Heath, P.O. Box 286, Bloomfield, N. Mex.
Filed Sept. 16, 1959, Ser. No. 840,340
4 Claims. (Cl. 183—2.7)

This invention relates to apparatus of the type designed to heat an emulsion as the combined oil and gas from an oil well or from a petroleum gas well under well pressure conditions prior to separating out the gas from the liquid in a high pressure separator, the separation being done under more efficient conditions by virtue of the emulsion having been thus pre-heated; the liquid thus separated then being returned for further low pressure heating and treatment and the gas being vented to the atmosphere or otherwise carried on for further disposition and use.

This type of apparatus may be employed in the wellhead line or predehydration separation, the method of applying heat being varied dependent upon the particular usage for which the separator step may be employed.

As a primary object the invention sets out to pre-heat emulsions such as emulsions of petroleum oil and gas to prevent congealing of liquids in the separation process and thereafter to remove impurities from separated liquids.

It is also another object of this invention to separate liquids from gases in a high-pressure separator prior to delivering them back to a low pressure vessel for further heat treating and for treatment to remove impurities.

It is also a further object of this invention to employ such a high pressure separator in combination with a low-pressure pre-heating process on well-heads, in various conduit lines, or in the type of separation known as pre-dehydration separation.

Other and further objects will be apparent when the specification hereinbelow is considered in connection with the drawings in which:

FIG. 1 is an elevation, part in section, and partially diagrammatic, showing the general arrangement of the various elements of the invention as may best be shown in views of this type;

FIG. 2 is a sectional plan view taken along line 2—2 of FIG. 1; and

FIG. 3 is a sectional elevation taken along line 3—3 of FIG. 1.

Referring in detail to the drawings, in which like reference numerals are assigned to like elements in the various views, there is shown a housing, tank, or casing, preferably with dished heads closing either end thereof. Such a tank is shown generally supporting a coil 2 therein, above and in slightly spaced relation from a burner 3, both the coil 2 and burner 3 being immersed in fluid, as a mixture of oil and water, and the heat of combustion of the gas in the burner being transmitted through the medium of the liquid to indirectly pre-heat any fluid, as an emulsion of petroleum oil and gas which may be caused to flow in the coil 2. The tank, housing, or pressure vessel which supports the coil 2 and burner 3 in the liquid may be termed a low-pressure vessel, in contra-distinction with a high-pressure separator 4 which separates the gas from the liquid, as such is delivered thereto in pre-heated state from the tank or housing.

At the top of the tank, extending along centrally thereof, there is provided a mist extractor 7 having suitable perforations 6 therein, the mist of fine liquid particles in gaseous suspension being vented from the mist extractor through a vent 5 suitably controlled by a valve, not shown. A suitable arrangement of longitudinally spaced apart baffles 8 and 9 are provided within the tank to support the coil 2 and the burner 3 and to properly break up the fluid therein into its component parts, as water below and hydrocarbons above, as may be brought about by such baffling in any suitable treatment process.

Referring now to FIGS. 2 and 3, the heavier water which settles below the lighter oil flows into a weir pipe 10 or well and then rises into a suitable pipe 15 extending outwardly from the weir pipe and through an upstanding water weir baffle into a weir compartment 13. In this compartment the water rises up and flows out of the tube 15 into the weir compartment to be drained off through a water discharge pipe 31 suitably controlled by a dump valve, not shown.

A suitable water gauge glass 19 extends from the weir compartment through the end of the tank adjacent thereto to give visual indication of the water level in the weir compartment. Also a suitable interfaced gauge glass 11 is provided to communicate with the water therebelow and the oil thereabove to give visual indication outside of the tank as to the oil-water level.

Additionally, at the bottom of the tank a drain 12 is provided so that the entire contents of the tank may be drained out therethrough, the tank being well supported below such drain by conventional skids 14 to permit the tank to be transported from location to location.

In order to adjust the elevation of the pipe 15, from which the water discharges, a water weir adjustment hand hole 38 is provided and normally kept plugged. However, when it is desired to change the level of discharge from the pipe 15, from the uppermost elevation as shown in FIG. 3 to a lower discharge elevation, this may be accomplished by first opening wider the dump valve, not shown, which controls the discharge 31 from the water weir compartment 13.

Then the vertical leg of the pipe 15 is reached through the unplugged hand hole as soon as the water level subsides sufficiently, and such vertical leg is rotated about its elbow connection at the junction of the vertical and horizontal weir pipe legs, thereby moving the vertical leg of the pipe as indicated by the arrow 15 to change the elevation thereof. The manhole 38 may then be plugged and the water discharge valve closed in degree so that again the water may then rise in the water weir department 13, while the water discharge from the weir pipe 15 is thus established at a new elevation.

An oil weir 16 is provided on the opposite side of the tank from the water weir 13, the top of this weir being at an elevation above the top of the weir pipe 15, since the oil is lighter than the water and rises thereabove. Thus by adjustment of the adjustable water weir with relation to a fixed oil weir, or vice versa, the desired differential between the discharge elevation of these two fluids may be established. In this regard a suitable oil gauge glass 21 is provided at the end of the tank to indicate the oil elevation in the oil weir compartment 16. Also a suitable oil discharge 18 is also provided to extend from the bottom of the oil weir compartment 16 to discharge outwardly therefrom, as to a delivery point for treated oil, such oil discharge 18 being provided with a suitable dump valve, not shown.

The supply of gas which is delivered to the burner 3 is controlled by first passing it through a pre-heater 20 which extends downwardly into the tank between the oil weir compartment and the water weir pipe 10. A needle valve 23 is shown installed at the inlet into this supply gas pre-heater to control the feeding thereof and the opening and closing of this needle valve may optionally be controlled by a thermostat 26 visible and adjustable at the end of the tank and connected to operate responsive to the temperature attained in the tank to control the amount of supply gas being pre-heated.

Optionally such a thermostat 26 could control a damper in the burner 3 or it could control the degree of opening of a valve in the discharge line 42 from the pre-heater 20 into the burner 3, such entrance of the gas conduit 42 being indicated on FIG. 2.

A similar thermostat 33 installed in the top of the tank may serve generally the same control functions as the thermostat 26, the proximity of the thermostat 33 best indicating that it may be employed to control the opening of the needle valve 23 responsive to a drop in temperature indicated within the tank. Obviously, however, such thermostat could as well be employed to extend into the tank to measure the temperature of the products of combustion in the burner 3.

A water fill inlet is provided at 39 and such water fill could also be employed for the injection of chemicals into the tank, such chemical being of the general nature to precipitate impurities from the liquids handled therein. The sludges or precipitation are obviously of a nature to be washed out through the drain 12 and in this case a wash-out hose could well be inserted through the water fill 39 for this purpose.

Part of the fluids from a gas or oil well pass directly through the inlet conduit 29 into the tank while the rest split off at the T 46 to pass down the by-pass line 30 to enter the three-way valve 27 downstream of the discharge 25 from the tank to be hereinbelow described. Such gas and oil-water emulsions which enter the tank through the emulsion inlet 29 pass downwardly into the inlet tube 22 of the coil 2 and then course through the tube to pick up heat from the liquid therein which is heated by the burner 3 positioned slightly below the coil 2 in a manner that the liquid in the tank serves as the indirect medium transferring heat from the burner 3 to, and into, the coil 2.

Such gas and oil-water emulsion, now pre-heated and thus in a greater state of activity for further incidents, exits from the coil 2 by way of its discharge tube 32 and passes up the discharge riser 25 through the valve seat 44 into the three-way valve 27. The seating element which closes the valve seat 44 is shown diagrammatically as being a bi-meal thermostat carrying the seating element and so fabricated as to restrict the passage through the valve seat 44 responsive to increase of heat, and to open the passage through the valve seat 44 responsive to decrease of heat.

Thus when the gas from the tank is treated and preheated to a greater temperature than that required for the best functioning of the separator 4, the thermostat 43 begins to close the flow passage 44 to choke down the amount of emulsion which otherwise would be permitted by size and space limitations to enter the tank coil 2. Instead a greater amount of this incoming, un-heated emulsion will pass through the by-pass 30 to the valve 27 and onwardly through the discharge line 28 to the separator 4 in admixture with whatever reduced amount of emulsion the thermostat or floating valve 43 permits to pass through the flow passage 44.

As the bi-metal thermostat valve 43 is set to start closing at a substantially high temperature in conformity with the demands of the separator 4, which operates best in separating fluids therein which have arrived at substantially high temperatures, the valve 43 normally remains open or floats at all times, and is not particularly designed to completely close the flow passage 44. On the other hand the conventional stem of the three-way valve 27 is operative to close the by-pass port and the discharge port, which are ninety degrees apart, simply by turning the closure element 48 forty-five degrees in rotation from the open position shown in FIG. 1.

In order to facilitate the processes of separation carried on within the separator 4, an injection element such as a chemical injection valve 35, is adapted by installation to inject selective additives into the discharge line 28 to be carried on with the liquids as oil, and gas to the separator 4.

The separator 4 is of the conventional high pressure type in which a conventional combination of developed high pressures and structural arrangements directing the application of such pressures, result in effectively separating or "knocking out" the liquids from the gases, so that the liquid free gases may pass out of the separator gas discharge 45, to be dissipated or used in selected industrial processes, as desired, whereas the liquid falls into a liquid trap or liquid separator 17 to be further discharged through a conduit 41 at substantially the bottom thereof.

The conduit 41 contains therein adjacent the liquid trap 17, a motorized or automatically operable reduction valve 24 which is set to reduce the pressure of the discharged liquid passing therethrough, and which is automatically opened responsive to the entrapped liquid in the trap 17 rising to a predetermined level to actuate the control 40. Thereafter, as the liquid level subsides below range to actuate the control 40 it operates to close the valve 24.

From the valve 24 the liquids at reduced pressures pass on through the conduit 41 to the return liquid inlet 1 and back therethrough into the tank to be discharged against a semi-circular baffle 34 designed to break up the turbulence and agitation ordinarily caused by such discharges. The returned liquids thus drop lightly from the baffle 34 or join the other liquids in the tank with minimized turbulence. Within the tank such returned liquids may be further preheated, treated, and processed, and the water components settled from the oil components, and both components passed on from the tank over their separate weirs.

As other features of construction it is considered expedient to provide the burner 3 with a discharge flue, shown digrammatically in FIG. 1 but positioned to discharge so that the exhausted products of combustion may not be deposited in the vicinity of operational personnel and equipment. Also, the tank itself may have as many gauges, thermostats, and thermometers, and the like, as expediency demands, such as the thermometer 37 which extends therefrom to give visual indication of the temperature of the fluids within the tank.

The invention is not limited to the particular features of construction and methods of use hereinabove disclosed and described, but other structures and methods are also included as long as such may fall within the broad spirit of the invention and within the broad scope of interpretation claimed for and merited by the appended claims.

What is claimed is:

1. Treating apparatus including a heated tank, a preheating coil closed and separate from said tank and extending therethrough and having an oil-water emulsion and gas influent inlet thereinto, a three-way, thermostatically controlled valve having an upstream port, a downstream port, and a port centrally thereof, a conduit carrying gas and oil-water emulsion, as from a well, and connected to discharge into said emulsion and gas influent inlet, a by-pass line from said conduit upstream of said emulsion and gas influent inlet and connected to discharge said oil-water emulsion and gas influent into said central port, an oil-water emulsion and gas influent outlet from said pre-heating coil extending to said three-way valve upstream port, a high pressure separator at higher pressure than said tank, connection means connecting said three-way valve downstream port to said high pressure separator, separating means in said separator to separate said emulsion, within operative emulsion temperature limits, into a gas component and into a liquid component comprising an oil component and a water component, said three-way valve being adapted to choke down the amount of emulsion entering said upstream port responsive to increase in emulsion component temperature whereby a greater percentage of emulsion enters said central port from said by-pass line to lower the temperature of the emulsion flowing out said downstream port to said separator to within first predetermined temperature ranges within the operative emulsion temperature limits of said separating means, said separating means in said separator also including a liquid trap, a discharge conduit from said liquid trap, an automatically operable reduction valve in said discharge conduit including means to open said reduction valve responsive to the rise of liquid to a pre-determined level in said trap and to close said reduction valve upon subsidence of said liquid from said level, said discharge conduit returning said liquid to said tank at said first range of temperatures as controlled by said three-way valve upstream thereof to join liquid previously returned thereinto through said discharge conduit, means in the lower part of said tank to heat the liquid components comprising oil and water in said tank within second predetermined temperature ranges higher than said first range of temperatures whereby the heat imparted to said oil and water heats the gas and oil-water emulsion in its passage through said pre-heating coil to said oil-water emulsion and gas outlet, the controlling of the temperature of the returned liquid and the adding of heat to said oil and water in said tank augmenting the separation of oil and water, said apparatus including an oil and a water outlet from said tank with the oil outlet at a higher level than the water outlet.

2. Treating apparatus as claimed in claim 1, in which said tank includes means therein lower than said oil outlet to control the elevational differential between said oil and water outlets.

3. The method of treating an oil-water emulsion and gas influent which passes in a closed conduit through a first zone at relatively low pressure and through a temperature actuated control means for subsequent higher pressure separation of the oil and water emulsion from the gas at a first temperature in a second zone followed by the return of the oil and water emulsion to the first zone to be heated at a second temperature relatively higher than said first temperature and at a lower pressure, the process including the steps of by-passing part of the oil-water emulsion and gas influent through the temperature actuated control means, passing the remainder of the oil and water emulsion and gas influent through the closed conduit to the temperature actuated control means to join the by-passed part thereof, separating the joined parts of oil and water emulsion and gas influent into a gas component and an oil and water component in the second zone, returning the oil and water component to the first zone, heating the oil and water component in manner that heat therefrom heats the oil and water emulsion and gas influent in the closed conduit in its passage through the first zone as aforesaid, and gravitationally separating the oil and water component in the first zone into an oil component and a water component.

4. The method of treating an oil-water emulsion and gas influent as claimed in claim 3 in which the gravitational separation of the aforesaid oil and water components is accomplished by selectively adjusting the elevational differential therebetween.

References Cited in the file of this patent
UNITED STATES PATENTS

| | | |
|---|---|---|
| 2,619,187 | Hayes et al. | Nov. 25, 1952 |
| 2,732,070 | Glasgow et al. | Jan. 24, 1956 |
| 2,747,002 | Walker et al. | May 22, 1956 |
| 2,863,522 | Smith | Dec. 9, 1958 |
| 2,866,834 | Donnelly | Dec. 30, 1958 |
| 2,948,352 | Walker et al. | Aug. 9, 1960 |